United States Patent [19]

Kang

[11] Patent Number: 5,791,201

[45] Date of Patent: Aug. 11, 1998

[54] TORSIONAL DAMPER FOR A CRANK SHAFT

[75] Inventor: Young-Soon Kang, Kyungsangnam-do, Rep. of Korea

[73] Assignee: Hyundai Motor Company, Ltd., Seoul, Rep. of Korea

[21] Appl. No.: 687,680

[22] Filed: Jul. 26, 1996

[30] Foreign Application Priority Data

Jul. 27, 1995 [KR] Rep. of Korea .................. 1995-22486

[51] Int. Cl.[6] ........................................... F16F 15/10
[52] U.S. Cl. ................................................ 74/574; 74/572
[58] Field of Search ...................... 74/572–574; 188/378, 188/379; 464/180

[56] References Cited

U.S. PATENT DOCUMENTS

| 3,224,296 | 12/1965 | Civelli ................................ 74/573 R |
| 4,083,265 | 4/1978 | Bremer, Jr. . |
| 4,173,158 | 11/1979 | Geislinger ............................ 74/574 |
| 4,208,928 | 6/1980 | Conseur et al. ....................... 74/574 |
| 4,262,553 | 4/1981 | Bremer, Jr. . |
| 4,387,971 | 6/1983 | Grove et al. . |
| 4,440,123 | 4/1984 | Tsai ................................... 74/573 R |
| 4,583,912 | 4/1986 | Ball et al. . |
| 4,608,883 | 9/1986 | Bopp ................................... 74/574 |
| 4,615,096 | 10/1986 | Foster ................................ 464/24 |
| 4,691,589 | 9/1987 | Arakawa ............................ 74/573 F |
| 4,777,843 | 10/1988 | Bopp . |
| 5,218,884 | 6/1993 | Rohrle . |
| 5,322,474 | 6/1994 | Hashimoto et al. . |
| 5,388,481 | 2/1995 | Andra . |
| 5,435,783 | 7/1995 | Rohrle . |

FOREIGN PATENT DOCUMENTS

| 0340608 | 11/1989 | European Pat. Off. ........... 74/574 |
| 3334393 A1 | 4/1985 | Germany .......................... 74/574 |

Primary Examiner—Vinh T. Luong

[57] ABSTRACT

A crank shaft torsional damper for a vehicle, includes a crank shaft flange having a plurality of projections extending therefrom, a first mass member having a plurality of first grooves for receiving the plurality of projections of the crank shaft flange and having a plurality of ribs extending therefrom, a second mass member having a plurality of second grooves for receiving the plurality of ribs of the first mass member, and a plurality of elastic members disposed within the plurality of first and second grooves so as to effectively reduce torsional vibrations and booming noise of different frequency bands generated by the crank shaft of the vehicle.

17 Claims, 2 Drawing Sheets

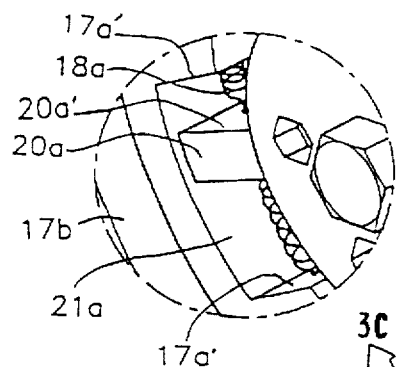
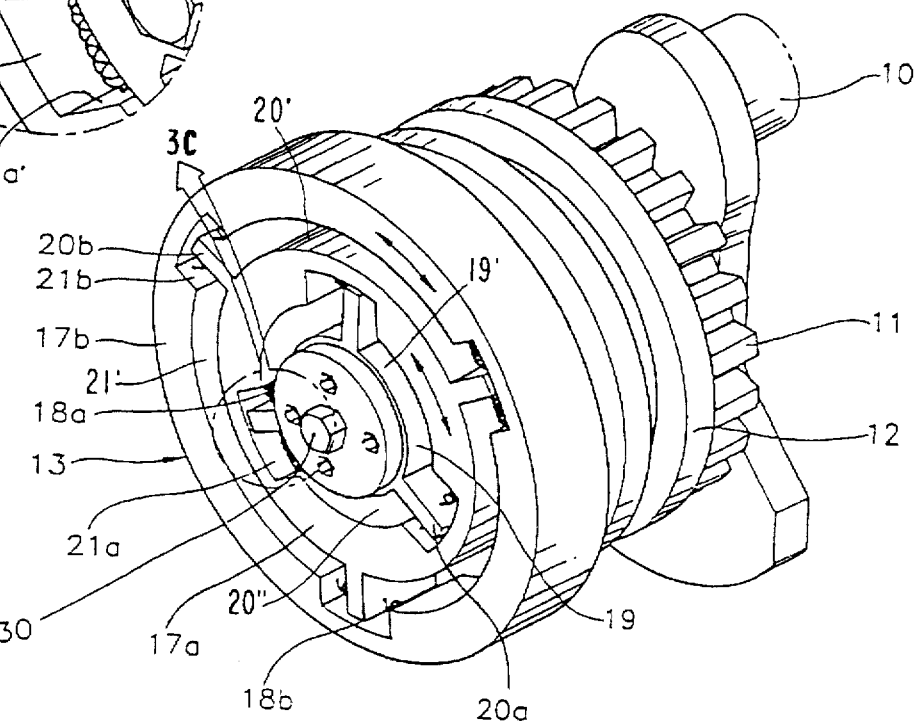
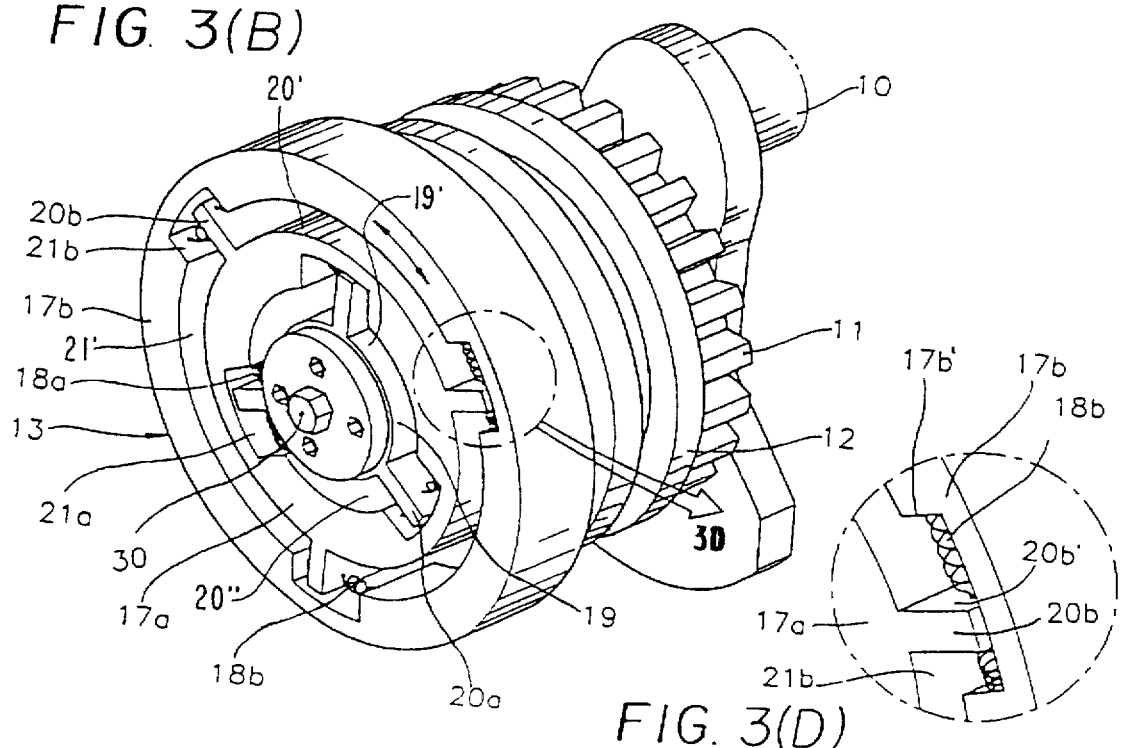

TORSIONAL DAMPER FOR A CRANK SHAFT

BACKGROUND OF THE INVENTION

1. Field of the Invention

The present invention relates to an improved torsional damper device for a crank shaft of a vehicle to control torsional vibrations of the crank shaft and, more particularly, to a torsional damper device including a plurality of masses supported by a plurality of springs for effectively reducing torsional vibrations and booming noise of many frequency bands of the crank shaft.

2. Description of Related Art

Various types of torsional damper devices for a crank shaft of a vehicle are known in the art. Generally, a crank shaft torsional damper device for a vehicle includes a crank shaft sprocket and a crank shaft pulley piled thereon. The crank shaft sprocket is mounted on an end portion of a crank shaft of a vehicle for reducing torsional vibrations (twisting vibrations) of the crank shaft.

As shown in FIG. 1, a conventional crank shaft torsional damper 13' is mounted on a crank shaft pulley 12' which is piled on a crank shaft sprocket 11' attached to a crank shaft 10'. The crank shaft torsional damper 13' includes an inner ring case 14 and an outer ring case 15 having a mass for forming a ring groove to fully receive an elastic rubber ring 16'. Therefore, the crank shaft torsional damper 13' functions to reduce torsional vibrations of the crank shaft 10' using the transformation of the elastic rubber ring 16' and utilizing the mass of the outer ring case 15.

However, such a conventional torsional damper 13' having the elastic rubber ring 16' suffers from a number of problems. For example, since the elastic rubber member 16' has a certain limited spring constant (k), the torsional damper 13' cannot control many frequency bands of vibrations generated by the crank shaft 10.' That is, it can control only one frequency band. Furthermore, it is easy for the elastic rubber ring 16' to be deformed under the heat of the vehicle engine. Then, it becomes difficult for the torsional damper 13' to control even one frequency band because the spring constant (k) of the elastic rubber ring 16' easily changes by the heat of the engine.

SUMMARY OF THE INVENTION

Accordingly, it is an object of the present invention to provide an improved torsional damper device for a crank shaft, which eliminates the above problems encountered with conventional torsional damper devices for a crank shaft of a vehicle.

Another object of the present invention is to provide a crank shaft torsional damper for a vehicle, including a plurality of masses supported by a plurality of springs which have different spring constants, so that the plurality of masses can share controlling the vibrations during any condition such as a high or low vehicle speed condition so as to reduce any types of frequency band vibrations of the crank shaft.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a torsional damper device for a vehicle, including a crank shaft flange having a plurality of projections, a first mass member having a plurality of first grooves for receiving the plurality of projections of the crank shaft flange and having a plurality of ribs extending therefrom, a second mass member having a plurality of second grooves for receiving the plurality of ribs of the first mass member, and a plurality of elastic members disposed within the plurality of first and second grooves for resiliently connecting the crank shaft flange, the first mass member and the second mass member so as to provide a dampening operation.

Furthermore, the present invention is directed to a method for controlling vibrations generated by a crank shaft of a vehicle, including the steps of forming a crank shaft flange having a plurality of projections, elastically receiving each of the projections into one of first grooves formed on a first mass member, and elastically receiving each of ribs formed on the first mass member into one of second grooves formed on a second mass member so as to control the vibrations from the crank shaft.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3(A) and 3(B) are perspective views of the crank shaft torsional damper device for a vehicle according to the present invention, and FIGS. 3(C) and 3(D) are enlarged detail views of the damper device shown in FIGS. 3(A) and 3(B).

DETAILED DESCRIPTION OF THE PREFERRED EMBODIMENTS

Figure 1:
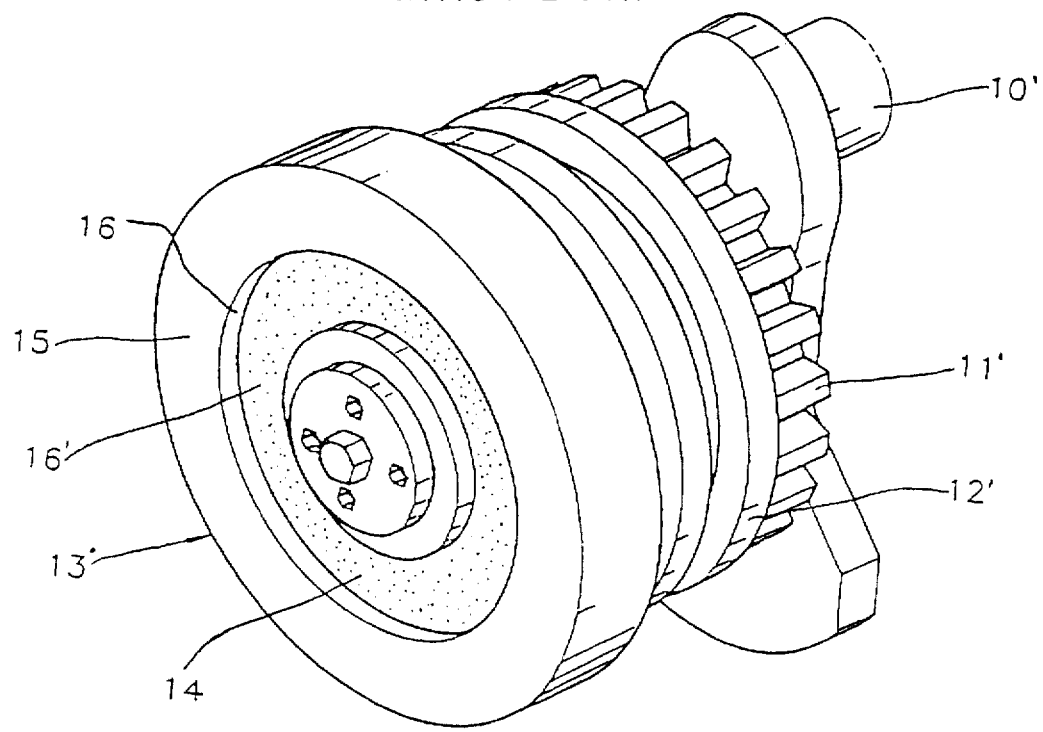
FIG. 1 is a perspective view of a conventional crank shaft torsional damper for a vehicle.
Figure 2:
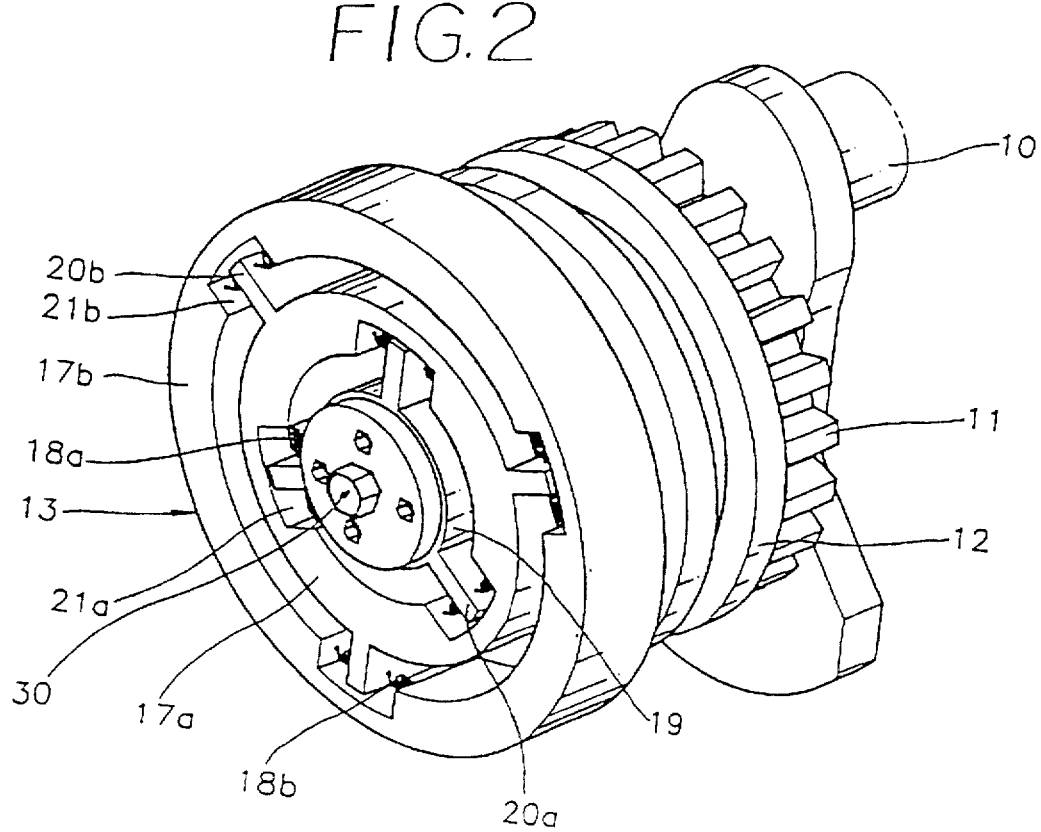
FIG. 2 is a perspective view of a crank shaft torsional damper device for a vehicle according to the embodiments of the present invention.

Referring now in detail to the drawings for the purpose of illustrating preferred embodiments of the present invention, the torsional damper device 13 for a crank shaft of a vehicle, as shown in FIG. 2, includes a first mass 17a having a small ring configuration and a second mass 17b having a diameter bigger than that of the first mass 17a.

As shown in FIG. 2, the first mass 17a is disposed within the second mass 17b. The damper device 13 defines a ring-shaped space between the first and second masses 17a and 17b. The first and second masses 17a and 17b are movably connected to each other through second springs 18b. The first mass 17a is movably connected to a crank shaft flange 19 though first springs 18a. The first and second masses 17a and 17b can resiliently move in a circular direction and within a certain degree range due to the first and second springs 18a and 18b. Also, the crank shaft flange 19, the first mass 17a and the second mass 17b have a same co-axle.

The crank shaft torsional damper 13 is stacked on a crank shaft pulley 12 and a crank shaft sprocket 11 fixed to a crank shaft 10 of a vehicle. Here, the number of masses 17a and 17b can increase so as to vary control of various frequency bands of the crank shaft 10.

As shown in FIGS. 3(A) through 3(D), the first mass 17a is provided with three ribs 20b extending from an outer surface 20' thereof, wherein the three ribs 20b are disposed at an equal distance from each other. For example, one rib 20b forms an angle of about 120° with an adjacent rib 20b, as shown in FIG. 3(B). The second mass 17b is provided with three grooves 21b disposed at an inner surface 21 thereof for receiving the ribs 20b correspondingly. The three grooves 21b are disposed at an equal distance from each other. For example, one groove 21b forms an angle of about 120° with an adjacent groove 21b.

Each second spring 18b is located between outer walls 20b' and 17b' of the first and second masses 17a and 17b in each groove 21b. Therefore, the first mass 17a and the second mass 17b are resiliently and operatively combined as a composite structure.

As shown in FIGS. 3(A) and 3(C), the crank shaft flange 19 is provided with three ribs (projections) 20a, extending from an outer surface 19' thereof. The three ribs 20a are disposed at an equal distance from each other, i.e., one rib 20a extends from the adjacent ribs 20a at an angle of about 120°. The first mass 17a is provided with three grooves 21a disposed at an inner surface 20" thereof for fully receiving the ribs 20a. The three grooves 21a are disposed at an equal distance from each other, i.e., one groove 21a extends from the adjacent groove 21a at an angle of about 120°. Each of the grooves 21a of the first mass 17a and grooves 21b of the second mass 17b extends circumferentially so that the ends of each groove form an angle of about 15° from a center point 30 of the crank shaft flange 19.

Each of the first springs 18a is located in a groove 21a between an outer wall 20a' of the crank shaft flange 19 and an outer wall 17a' of the first mass 17a. Therefore, the crank shaft flange 19 and the first mass 17a are resiliently and operatively combined as a composite structure as shown in FIG. 3(A).

Accordingly, a center of each groove 21b forms with a center of the adjacent groove 21a an angle of about 45° from the center point 30 so as to receive the maximum effect of the damping operation. That is, the grooves 21a of the first mass 17a and the grooves 21b of the second mass 17b are never aligned and disposed apart at the maximum distance such that the torsional vibration of the crank shaft 10 can be transferred in serial order for effectively reducing the torsional vibrations and booming noise of many frequency bands generated by the crank shaft 10.

The first and second springs 18a and 18b have different spring constants (k). The spring constant (k1) of the first spring 18a for connecting the first mass 17a and the crank shaft flange 19 is smaller than the spring constant (k2) of the second spring 18b for connecting the first and second masses 17a and 17b. Therefore, the present invention allows the optimal characteristics of the first and second springs 18a and 18b to be used depending on the size of the engine torque, which is changeable according to the difference in the engine revolution number.

For example, when the engine revolution number is low, the difference in the engine torque is low. At this time, the torsional vibration of the crank shaft 10 is controlled by the displacement of the first spring 18a. However, when the engine revolution number is high, the difference in the engine torque is high. At this time, the torsional vibration of the crank shaft 10 is controlled by the second spring 18a.

The crank shaft torsional damper device for a vehicle of the present invention operates as follows. As shown in FIG. 3(A), the first mass 17a and the second mass 17b move intermittently due to the displacement of the first springs 18a. At this time, the torsional damper device 13 of the present invention can control the vibration of the frequency bands in a lower vehicle speed, e.g., about 20 Hz–30 Hz.

That is, since the spring constant (k2) of the second springs 18b is bigger than that of the first springs 18a, the total mass of the first and second masses 17a and 17b and the second spring 18a connecting the first and second masses 17a and 17b can be dampened by the displacement of the first springs 18a.

As shown in FIG. 3(B), the second mass 17b moves intermittently due to the displacement of the second springs 18b. At this time, the first mass 17a of the torsional damper device 13 of the present invention can control the vibration of the frequency bands in a high vehicle speed, e.g., over 50 Hz.

In this condition, generation of the engine torque exceeds the spring value of the first springs 18a. At this time, the first springs 18a lean toward the rotating direction of the crank shaft flange 19, so that the first springs 18a are combined with the crank shaft flange 19 as one composite structure. Therefore, the second mass 17b of the torsional damper device 13 of the present invention can control the vibration of the frequency bands over 50 Hz.

Also, the torsional damper device 13 of the present invention has other advantages. For example, the first and second springs 18a and 18b are not effected by the engine heat so that their original spring constants (k1) and (k2) are maintained even under the engine heat. Accordingly, the crank shaft torsional damper 13 of the present invention can control various frequency bands of vibrations generated by the crank shaft 10 for improving the performance of engine operation.

Furthermore, the crank shaft torsional damper device 13 of the present invention can have a greater number of masses than two in order to vary the range of frequency band. At which time, the spring constants (k) have to be increased in proportion to the size of the masses 17a and 17b.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A torsional damper device comprising:

a crank shaft flange having a plurality of projections;

a first mass member having a plurality of first grooves for receiving the plurality of projections of the crank shaft flange and having a plurality of ribs extending therefrom;

a second mass member having a plurality of the second grooves for receiving the plurality of ribs of the first mass member; and a plurality of elastic members disposed within the plurality of first and second grooves for resiliently connecting the crank shaft flange, the first mass member and the second mass member so as to provide a dampening operation.

2. A device of claim 1, wherein the crank shaft flange has a circular configuration and the projections of the flange extend from an outer surface thereof.

3. A device of claim 1, wherein the projections of the flange are disposed at an equal distance from each other.

4. A device of claim 1, wherein the first mass member has a first ring configuration and the first grooves of the first mass member are disposed at an inner surface thereof.

5. A device of claim 4, wherein the ribs of the first mass member extend from an outer surface thereof and are disposed at an equal distance from each other.

6. A device of claim 5, wherein the second mass member has a second ring configuration, and the second grooves of the second mass member are disposed at an inner surface thereof and at an equal distance from each other.

7. A device of claim 6, wherein at least one of the first grooves extends circumferentially so that its ends form a 15° angle from a center of the crank shaft flange.

8. A device of claim 6, wherein the size of the second ring configuration is greater than the size of the first ring configuration.

9. A device of claim 5, wherein at least one of the second grooves extends circumferentially so that its ends form a 15° angle from a center of the crank shaft flange.

10. A device of claim 1, wherein a center of each of the first grooves is misaligned with a center of an adjacent second groove.

11. A device of claim 10, wherein the center of each of the first grooves forms a 45° angle with the center of the adjacent second groove from a center of the crank shaft flange.

12. A device of claim 1, wherein one of the first grooves forms a 120° angle with an adjacent one of the first grooves from a center of the crank shaft flange.

13. A device of claim 12, wherein one of the second grooves forms a 120° angle with an adjacent one of the second grooves from the center of the crank shaft flange.

14. A device of claim 1, wherein there are three projections, three ribs, three first grooves, and three second grooves.

15. A device of claim 1, wherein the elastic members include first springs and second springs, the first springs having a spring constant different from that of the second springs.

16. A device of claim 15, wherein each of the first springs is disposed between an outer wall of one of the projections and an outer wall of the first groove receiving the one of the projections.

17. A device of claim 15, wherein each of the second springs is disposed between an outer wall of one of the ribs and an outer wall of the second groove receiving the one of the ribs.

* * * * *